(12) United States Patent
Baldemair et al.

(10) Patent No.: US 10,182,445 B2
(45) Date of Patent: Jan. 15, 2019

(54) METHODS AND DEVICES FOR CONTROLLING RESOURCE USAGE

(71) Applicant: Telefonaktiebolaget L M Ericsson (publ), Stockholm (SE)

(72) Inventors: Robert Baldemair, Solna (SE); David Hammarwall, Vallentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 335 days.

(21) Appl. No.: 14/900,413

(22) PCT Filed: Jun. 26, 2013

(86) PCT No.: PCT/SE2013/050790
§ 371 (c)(1),
(2) Date: Dec. 21, 2015

(87) PCT Pub. No.: WO2014/209178
PCT Pub. Date: Dec. 31, 2014

(65) Prior Publication Data
US 2016/0143039 A1 May 19, 2016

(51) Int. Cl.
*H04W 72/04* (2009.01)
*H04W 76/15* (2018.01)
(Continued)

(52) U.S. Cl.
CPC ..... *H04W 72/0486* (2013.01); *H04W 72/042* (2013.01); *H04W 72/1252* (2013.01);
(Continued)

(58) Field of Classification Search
CPC ........... H04W 72/0486; H04W 72/042; H04W 72/1252; H04W 72/1268; H04W 72/1273; H04W 76/025; H04W 88/06
See application file for complete search history.

(56) References Cited

U.S. PATENT DOCUMENTS

2011/0134831 A1  6/2011  Pirskanen
2013/0044709 A1  2/2013  Adjakple et al.
(Continued)

FOREIGN PATENT DOCUMENTS

EP      2986074 A1 *  2/2016  ........ H04W 72/1242
WO  WO 2011134493 A1 * 11/2011  ......... H04B 7/15592

*Primary Examiner* — Melvin C Marcelo
(74) *Attorney, Agent, or Firm* — Patent Portfolio Builders, PLLC

(57) ABSTRACT

A method 10 is presented for controlling resource usage performed in a first network node 2. The first network node 2 has a first uplink connection UL1 and a first downlink connection DL1 with a wireless device 5. The method 10 comprises transmitting 11, to a wireless device 5, configuration instructions instructing the wireless device 5 to enter a dual connectivity mode with a second network node 3 on a second uplink connection UL2 and a second downlink connection DL2 between the wireless device 5 and the second network node 3; and when one or more of the uplink and/or downlink connections UL1, DL1, UL2, DL2 to the first and/or second network nodes 2, 3 is determined to be able to operate on a reduced set of resources, transmitting 12 to the wireless device 5 configuration instructions instructing the wireless device 5 to operate on a reduced set of resources for the one or more uplink and downlink connections UL1, DL1, UL2, DL2.

14 Claims, 5 Drawing Sheets

(51) Int. Cl.
 *H04W 72/12* (2009.01)
 *H04W 88/06* (2009.01)

(52) U.S. Cl.
 CPC ... *H04W 72/1268* (2013.01); *H04W 72/1273* (2013.01); *H04W 76/15* (2018.02); *H04W 88/06* (2013.01)

(56) References Cited

U.S. PATENT DOCUMENTS

| | | |
|---|---|---|
| 2013/0088983 A1 | 4/2013 | Pragada et al. |
| 2015/0365857 A1* | 12/2015 | Wei ................. H04W 24/10 370/331 |
| 2016/0150502 A1* | 5/2016 | Sebire ............... H04W 72/04 455/450 |

* cited by examiner

METHODS AND DEVICES FOR CONTROLLING RESOURCE USAGE

TECHNICAL FIELD

The technology disclosed herein relates generally to the field of wireless communication, and in particular to resource utilization within such wireless communication.

BACKGROUND

Wireless communication is used extensively and is still increasing. Users within a wireless communication network demand communication links that provide them with fast and uninterrupted data communication and ways of providing services to the users are constantly being developed and improved. Operators of wireless communication systems thus strive to offer the users high quality communication links with the scarce resources, e.g. particular frequency bands that are available to them.

Dual connectivity is a feature defined from the perspective of a wireless device, wherein the wireless device may receive from and transmit to at least two different network points, and thereby being provided with increased communication resources. The network point, e.g. a base station such as a eNode B, is a node enabling communication between a wireless device and the network. Dual connectivity is defined for the cases when aggregated network points operate on the same or separate frequencies. That is, the wireless device is connected to two or more network points, which may operate on same or separate frequencies. Each network point that a wireless device is aggregating may, but need not, define a stand-alone cell.

Dual connectivity as a feature bears many similarities with carrier aggregation and coordinated multi-point (CoMP). In CoMP, the wireless device transmits and receives data to and from several network points, and CoMP may improve the overall quality for the user as well as improve the utilization of the wireless communication network. A main differentiating factor is that dual connectivity is designed in consideration of a relaxed backhaul and less stringent synchronization requirements between the network points. This is in contrast to carrier aggregation and CoMP, wherein tight synchronization and a low-delay backhaul are assumed between the aggregated network points.

Besides providing users fast data throughput e.g. by offering several communication links, there are other aspects for obtaining high user satisfaction. One such other aspect is the provision of energy efficient operation, which for the wireless device translates into maximized battery operation time. Procedures defined up to date for connecting to a network point have been developed in view of maximized data throughput rather than energy efficiency.

It would thus be desirable to enable energy efficient operation of a wireless device while still offering fast data throughput.

SUMMARY

An object of the present teachings is to overcome or at least alleviate the above mentioned shortcomings of prior art. A particular object of the present teachings is to provide energy efficient operation for wireless devices in dual connectivity mode.

The object is according to a first aspect achieved by a method for controlling resource usage performed in a first network node. The first network node has a first uplink connection and a first downlink connection with a wireless device. The method comprises: transmitting, to the wireless device, configuration instructions instructing the wireless device to enter a dual connectivity mode with a second network node on a second uplink connection and a second downlink connection between the wireless device and the second network node; and when one or more of the uplink and/or downlink connections to the first and second network nodes is determined to be able to operate on a reduced set of resources, transmitting to the wireless device configuration instructions instructing the wireless device to operate on a reduced set of resources for the one or more uplink and downlink connections.

The method enables an energy efficient operation of a wireless device operating in dual connectivity mode. By limiting the transmission and/or reception resources the wireless device is enabled to save battery life time by e.g. turning off some hardware and/or by using a lower sampling rate.

The object is according to a second aspect achieved by a network node for controlling resource usage and operative to have a first uplink connection and a first downlink connection with a wireless device. The network node comprises a processor and memory, the memory containing instructions executable by the processor, whereby the network node is operative to transmit, to a wireless device, a configuration message instructing the wireless device to enter a dual connectivity mode with a second network node on a second uplink connection and a second downlink connection between the wireless device and the second network node; and when one or more of the uplink and/or downlink connections to the first and second network nodes is determined to be able to operate on a reduced set of resources, transmitting to the wireless device configuration instructions instructing the wireless device to operate on a reduced set of resources for the one or more uplink and downlink connections. Advantages corresponding to the above are obtained.

The object is according to a third aspect achieved by a method performed in a wireless device for controlled resource usage. The wireless device has a first uplink connection and a first downlink connection with a network node. The method comprises receiving, from the network node, configuration instructions to enter a dual connectivity mode with a second network node on a second uplink connection and a second downlink connection between the wireless device and the second network node; receiving, from the network node, configuration instructions to operate on a reduced set of resources for the uplink and/or downlink connection to the first network node and/or to operate on a reduced set of resources for the uplink and/or downlink connection to the second network node. Advantages corresponding to the above are obtained.

The object is according to a fourth aspect achieved by a wireless device for controlled resource usage. The wireless device has a first uplink connection and a first downlink connection with a network node. The wireless device comprises a processor and memory, the memory containing instructions executable by the processor, whereby the wireless device is operative to receive, from the network node, configuration instructions to enter a dual connectivity mode with a second network node on a second uplink connection and a second downlink connection between the wireless device and the second network node; receive, from the network node, configuration instructions to operate on a reduced set of resources for the uplink and/or downlink connection to the first network node and/or to operate on a reduced set of resources for the uplink and/or downlink connection to the second network node. Advantages corresponding to the above are obtained.

Further features and advantages of the present teachings will become clear upon reading the following description and the accompanying drawings.

DETAILED DESCRIPTION

Figure 1:
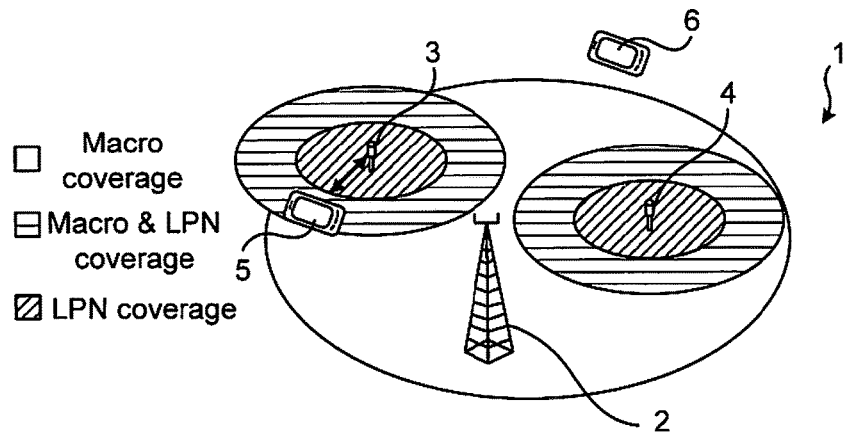
FIG. 1 illustrates a dual connection scenario.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the teachings herein describe methods that enable energy efficient operation of a wireless device operating in dual connectivity mode. As a particular example, a wireless device having a low data volume (user and/or control plane) exchanged with one of the network nodes (in uplink and/or downlink), may benefit from the present teachings. An example of a situation wherein the wireless device has low data volume in one connection, i.e. a low activity connection, is when only feedback is transmitted in an uplink connection, which will be described more in detail later.

By either limiting the transmission and/or reception resources, the resources here being exemplified by bandwidth, on a carrier of the low activity connection to a bandwidth less than the system bandwidth, the wireless device is provided with a more energy efficient operation. In other embodiments this object may be achieved by adopting a point-specific discontinuous reception/discontinuous transmission (DRX/DTX) pattern.

FIG. 1 illustrates a dual connection scenario in a wireless communication network 1 (in the following denoted network 1). The network 1, in which aspects of the present teachings may be implemented, comprises one or more network nodes 2, 3, 4, e.g. a base station, eNodeB or relay, serving wireless devices 5, 6. The network node is sometimes denoted network point. The wireless device 5 is in dual connection; it has one or more uplink (UL) connections for transmission of data from the wireless device to the network node and/or downlink (DL) connections for transmission of data from the network node to the wireless device to a first network node 2 as well as to a second network node 3. The different network nodes 2, 3, 4 may provide different coverage; the second network mode 3 may for example be a low power node (LPN), transmitting at a lower power than the first network node 2 and thus having a smaller coverage area than the first network node 2. The first network node 2 may be a high power node, e.g. a macro node, providing a larger coverage area (macro coverage) than the second network node 3.

Figure 2:
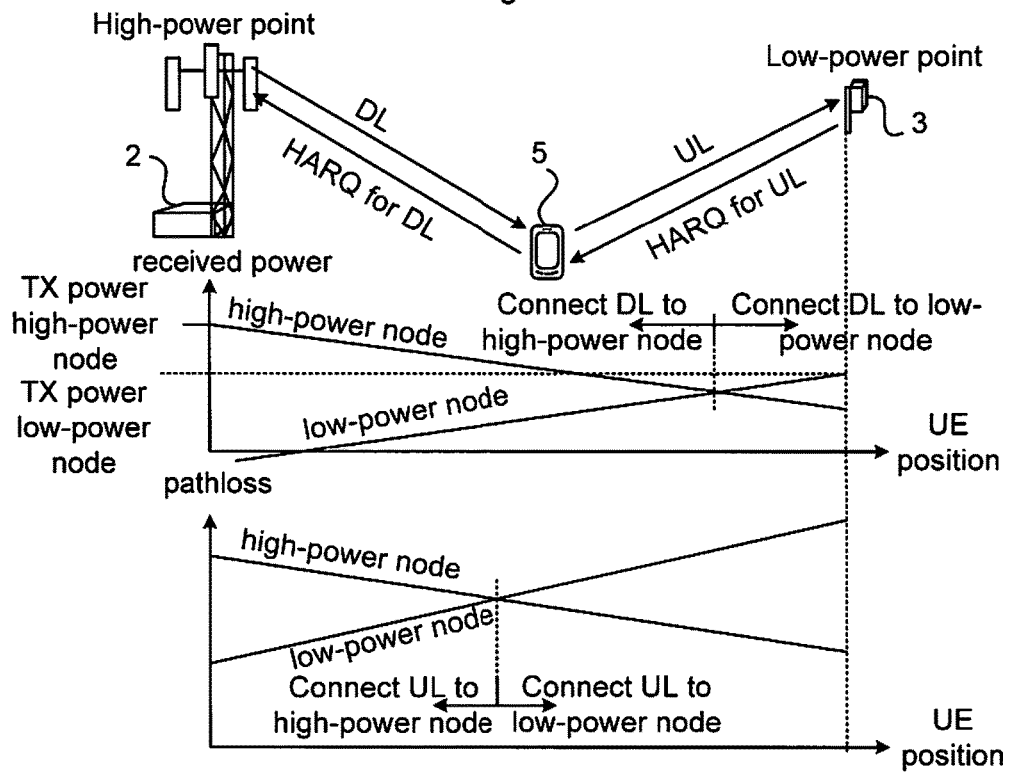
FIG. 2 illustrates aspects of an uplink/downlink separation situation.

One example wherein the wireless device 5 can have low activity—in at least one of the UL or DL directions— towards one network point while having high activity towards another network point is the case of UL/DL separation. The wireless device 5 receives DL data from one point but transmits user data towards another point. To enable various backhaul solutions, in particular also backhauling solutions with large latency, Hybrid Automatic-Repeat-Requests (HARQ) feedback for downlink transmissions must be sent to the network node that is transmitting DL. Likewise, a network node that is receiving an UL transmission should also be the one that generates the HARQ feedback for the UL transmission. That is, the HARQ feedback is generated/received in the same network point that the data are associated with. With reference now to FIG. 2, this scenario is described more in detail in the following.

The UL/DL separation situation, where DL is received from one network node whereas UL is transmitted to another network node, is an example of dual connectivity. Using this feature, optimal network nodes for uplink and downlink can be selected independently of each other. For the uplink, the optimal reception point is often the one with the lowest path loss towards the wireless device 5, whereas in DL typically the network node with the highest reception power is preferable. FIG. 2 illustrates this. In particular, in the upper graph, the received power of the wireless device 5 is illustrated as function of its distance to the respective network nodes 2, 3. In the lower graph, the path loss of the wireless device is illustrated as function of its distance to the respective network nodes 2, 3. The wireless device 5 thus selects the network node with the lowest path loss as its main UL network node, i.e. network node 3 in the illustrated case, and receives DL from the network node with the highest received power, i.e. network node 2. From FIG. 2 it can be seen that depending on the location of the wireless device 5 in relation to the first and second network nodes 2, 3, a different network node may be chosen for UL and/or DL. The HARQ responses for the respective communication links still needs, as mentioned, be handled so as to meet different backhaul requirements. The wireless device 5 is thus connected in the UL with the second network node 3 but only receives HARQ feedback for its UL transmissions from this network node 3. Correspondingly, the wireless device 5 is connected in the DL with the first network node 2, but only transmits HARQ feedback for the DL transmissions to this network node 2.

Typical system bandwidths of a DL/UL transmitted/received by the same network node are the same or at least similar. This makes sense since traffic is often at least somewhat symmetric. In case of UL/DL separation; at the DL network node the situation is however different: to a specific wireless device 5 this network node transmits DL data but only receives corresponding HARQ feedback from the wireless device 5. The wireless device 5 thus requires a large bandwidth in DL but only a small bandwidth in UL (towards this network node). For another wireless device 6 the situation may be different and this particular network node may be used as main network node for UL transmissions, i.e. the UL bandwidth offered by this point to wireless device 6 can be large. Therefore this network node must offer both large DL bandwidths and UL bandwidths.

Forcing the first wireless device 5 to operate on the wide UL system bandwidth can be energy inefficient. Therefore, in an aspect, the wireless device 5 can be configured with an UL bandwidth smaller than UL system bandwidth. The bandwidth as communication resource is merely an illustrative example, and in a more generalized aspect of the present teachings, the wireless device 5 may be configured with a reduced set of resources for the one or more UL and/or DL connections.

Figure 3:
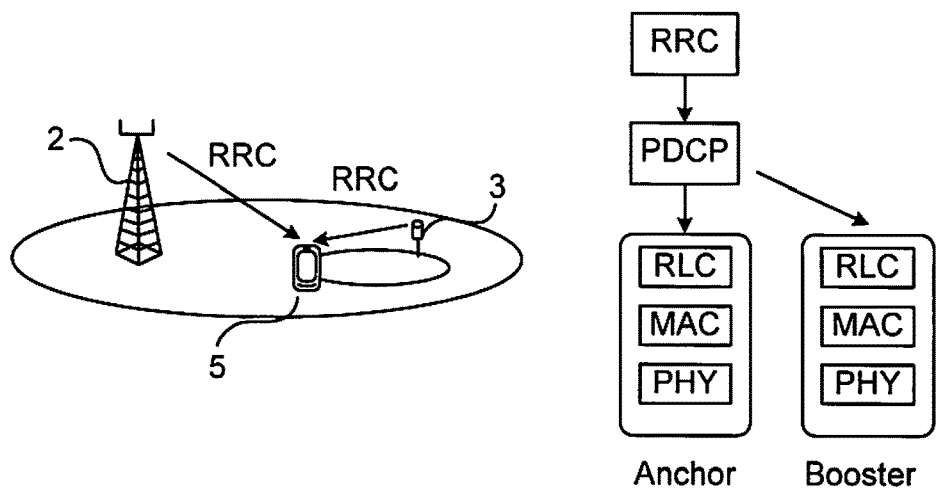
FIG. 3 illustrates Radio Resource Control diversity and protocol termination.

With reference to FIG. 3, another form of dual connectivity can be defined in terms of simultaneous connection to an anchor node 2 and at least one booster node 3. As the name implies, the anchor node 2 terminates the control plane connection towards the wireless device 5 and is thus the controlling node of the wireless device 5. The wireless device 5 also reads system information from the anchor node. In addition to the anchor node 2, the wireless device 5 may be connected to one or several booster nodes 3 for added user plane support.

The anchor node 2 and booster node 3 roles are defined from a wireless device 5 point of view. This means that a node that acts as an anchor node to one wireless device 5 may act as booster to another wireless device. Similarly, though the wireless device 5 reads the system information from the anchor node 2, a node acting as a booster to one wireless device 5, may or may not distribute system information to another wireless device. It is also noted that for same frequency operation, it could be beneficial to let the booster node distribute System Information (SI) to wireless devices that are close to the booster node and that cannot receive SI from the anchor node. The anchor node provides system information, terminates control plane and may terminate user plane, i.e. supports user plane protocols, such as Packet Data Convergence Protocol (PDCP), Radio link control protocol (RLC), medium access control protocol (MAC) and physical layer protocol (PHY). The booster node terminates user plane.

Still with reference to FIG. 3, another feature enabled with dual connectivity is radio resource control (RRC) diversity. With this feature RRC signaling messages can be communicated with the wireless device 5 via the anchor and booster links. Thereby, it is assumed that the RRC and PDCP protocol termination point lies in the anchor node and thus signaling messages are routed as duplicate PDCP protocol data units (PDUs) also via the backhaul link between the anchor and the booster. On the wireless device 5 side, duplicate PHY/MAC/RLC instances are required, and a separate Radio Access Channel (RACH) procedure to obtain time synchronization and Cell Radio Network Temporary Identifier (CRNTI) for each link.

Improved mobility robustness is an argument for dual connectivity; dual connectivity could provide improved handover. RRC diversity is thus an especially interesting feature for the transmission of handover related messages such as wireless device measurement reports and RRC-reconfiguration requests ("handover commands"). Previous to a handover situation, the wireless device 5 may be ordered to enter (and later leave) the RRC diversity-state based on legacy or new measurement reporting and new connection reconfiguration. Within this diversity mode, the connection to the wireless device 5 is considered to be lost only if both links are considered to be out-of-sync or insufficient Signal to Interference and Noise Ratio (SINR) is experienced, i.e. the wireless device 5 experiences radio-link-failure (RLF) on both links, or maximum RLC retransmission counters/timers are reached for both links. It is noted that the criteria for lost connections could be other besides the one mentioned here, and may also depend on the communication protocol at hand.

Figure 4:
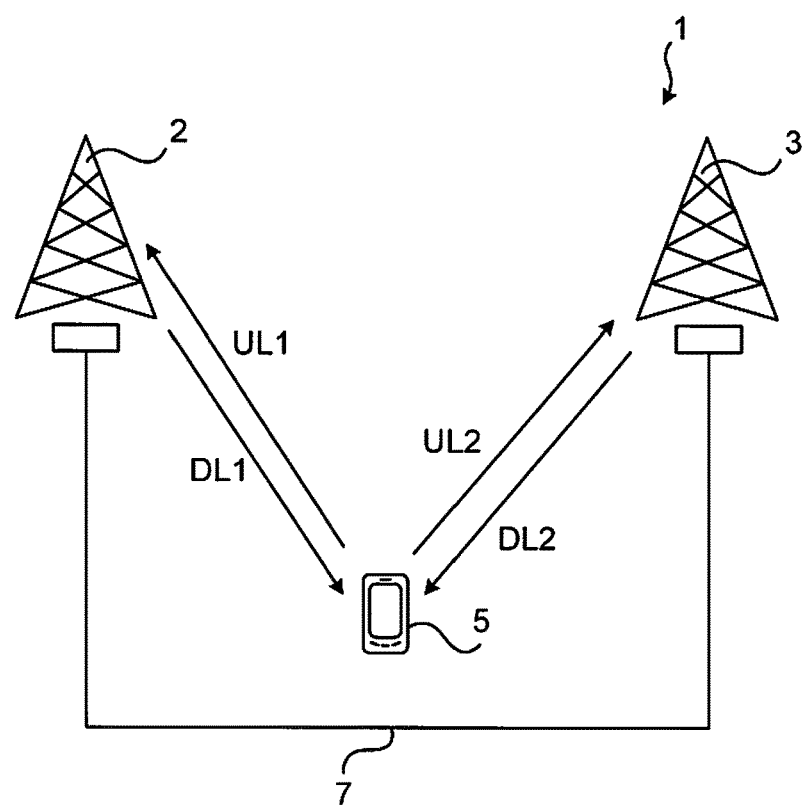
FIG. 4 illustrates schematically an environment in which embodiments of the present teachings may be implemented.

FIG. 4 illustrates schematically an environment in which embodiments of the present teachings may be implemented. The wireless communication network 1 comprises, as has already been described in relation to e.g. FIG. 1, at least a first network node 2 and a second network node 3. The network nodes 2, 3 may be any of the already described network nodes, for example a base station, eNodeB, or relay being a low power network node, such as a pico node, or a high power network node such as a macro node, anchor node or booster node. The wireless device 5 may comprise any type of device configured for wireless communication. Such device may be denoted and exemplified in various ways e.g. a user equipment, a mobile communication device, subscriber terminal, and may comprise e.g. a cellular telephone, a computing device, a smart phone etc. The concept of wireless device also comprises devices with communication capability of machine-type character, such as sensors, actuators, measurement devices etc. that is not necessarily in any interaction with a user.

The wireless device 5 is configured for or operative to have a first uplink connection UL1 and a first downlink connection DL1 with the first network node 2. It is noted that the wireless device 5 may have more than one uplink connection to and more than one downlink connection from the first network node 2. Conversely, the first network node 2 is operative to have a first uplink connection UL1 and a first downlink connection DL1 with the wireless device 5. The wireless device 5 is further configured so as to be able to enter a dual connectivity mode. The wireless device 5 is therefore further operative to be able to have a second uplink connection UL2 and a second downlink connection DL2 with a second network node 3. Correspondingly, the second network node 3 is operative to have a second uplink connection UL2 and a second downlink connection DL2 with the wireless device 5. It is again noted that the wireless device 5 may have more than one uplink connection to and more than one downlink connection from the second network node 3.

The first network node 2 and the second network node 3 are interconnected via any type of communication means, e.g. fiber optic cables, providing communication links for communicating data between the network nodes 2, 3.

Figure 5:
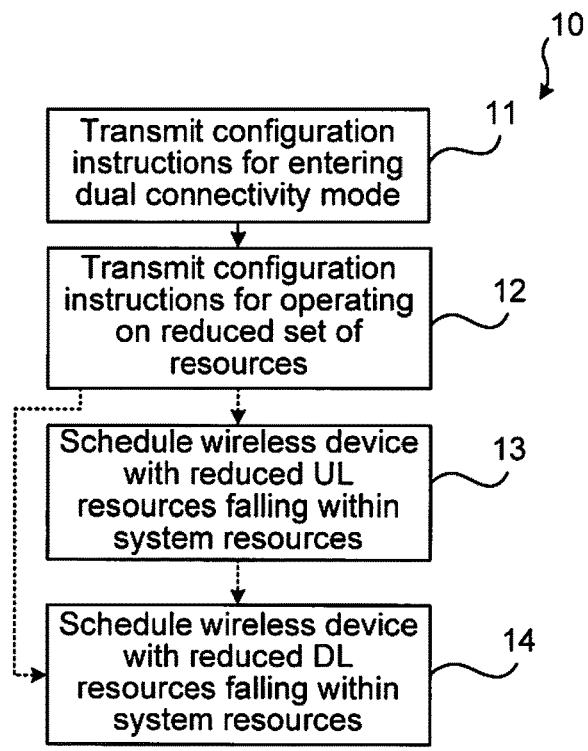
FIG. 5 illustrates a flowchart over steps of a method in a network node in accordance with the present teachings.

FIG. 5 illustrates a flowchart over steps of a method 10 in a network node in accordance with the present teachings. The method 10 may be used for controlling resource usage and may be performed in a first network node 2. The first network node 2 has a first uplink connection UL1 and a first downlink connection DL1 with a wireless device 5. The method 10 comprises transmitting 11 to the wireless device 5 configuration instructions instructing the wireless device 5 to enter a dual connectivity mode with a second network node 3 on a second uplink connection UL2 and a second downlink connection DL2 between the wireless device 5 and the second network node 3 (compare FIG. 4). The configuration instructions is transmitted 11 to a wireless device 5 being suitable for a dual connectivity mode, which suitability may be determined or established in different ways, e.g. based on information received from the wireless device 5.

The method 10 further comprises transmitting 12, when one or more of the uplink and downlink connections UL1, DL1, UL2, DL2 to the first and second network nodes 2, 3 is determined to be able to operate on a reduced set of resources, to the wireless device 5 configuration instructions instructing the wireless device 5 to operate on a reduced set of resources for the one or more uplink and downlink connections UL1, DL1, UL2, DL2. That is, the network node 2 configures the wireless device 5 to have a reduced set of resources for the uplink and/or downlink connection UL1, DL1 to the first network node 2 and/or to have a reduced set of resources for the uplink and/or downlink connection UL2, DL2 to the second network node 3. This configuration may be based on the amount of data to be transmitted from/received by the wireless device 5 on the respective connections UL1, UL2, DL1, DL2.

The uplink or downlink connections UL1, DL1, UL2, DL2 to the first and second network nodes 2, 3 being determined to be able to operate on a reduced set of resources, may for example comprise determining the data need in the uplink corresponding to a resource need less than default resources provided by the communication network 1. For example, typically the communication network 1 is configured to operate on a specific bandwidth in uplink (the resources thus here being exemplified by bandwidth), and the wireless device 5 may, according to the method 10, be configured to operate in UL on only part of this system bandwidth. It is noted that the data may comprise user plane data or control plane data.

In an embodiment, the transmitting 12 configuration instructions instructing the wireless device 5 to operate on a reduced set of resources, is transmitted to a wireless device 5 having a data amount in the uplink or downlink connection UL1, DL1 to the first network node 2 that corresponds to a resource need smaller than the resources provided by the system for these connections, or more generally smaller than a first threshold, and/or having a data amount in the uplink or downlink connection UL2, DL2 to the second network node 3 that corresponds to a resource need smaller than the resources provided by the system for these connections, or more generally smaller than a second threshold. For example, if the resources to be operated on (i.e. communication resources) comprises frequencies, i.e. bandwidth, then the configuration instructions are transmitted to a wireless device 5 determined to have a data amount in one or more of the connections UL1, DL1, UL2, DL2 to the first and the second network node 2, 3 that corresponds to a bandwidth need smaller than the bandwidth threshold for these connections.

The configuration instructions transmitted to the wireless device 5 instructing the wireless device 5 to enter a dual connectivity mode and instructing the wireless device 5 to operate on a reduced set of resources may be transmitted in several separate messages or in a single message.

In an embodiment, the wireless device 5 is configured with a reduced set of resources in one or both of the uplink connections UL1, UL2. The method 10 further comprises scheduling 13 the wireless device 5 with uplink resources falling within the reduced set of uplink resources. This ensures that the wireless device 5 is able to transmit data to one or both of the network nodes 2, 3. There are different ways of scheduling reduced resources to the wireless device 5. In case of the resources comprising bandwidth, different parts of the entire bandwidth provided by the system may be chosen for scheduling to the wireless device. Correspondingly, in case of the resources comprising time slots, the total number of available time slots may be scheduled in different ways. Examples of such scheduling 13 will be described later with reference to FIGS. 11 and 12.

In an embodiment, the wireless device 5 is configured with a reduced set of resources in one or both of the downlink connections DL1, DL2. The method 10 further comprises scheduling 14 the wireless device 5 with downlink resources falling within the reduced downlink bandwidth. This ensures that the wireless device 5 is able to receive data from one or both of the network nodes 2, 3.

The steps of scheduling 13, 14 may be used and combined in various embodiments, as indicated by the dashed lines in FIG. 5. For example, in an embodiment, wherein an uplink connection is determined to be able to operate on a reduced set of resources, the method 10 comprises the step 13 only. That is, the wireless device 5 is scheduled on a reduced set of UL resources of the entire set of UL resources provided by the system. The resources on which the wireless device 5 is scheduled thus falls within the resources provided by the system. In another embodiment, wherein a downlink connection is determined to be able to operate on a reduced set of resources, the method 10 comprises this step 14 only. That is, the wireless device 5 is scheduled on a reduced set of DL resources of the entire set of DL resources provided by the system. The resources on which the wireless device 5 is scheduled thus falls within the resources provided by the system. In still another embodiment, wherein an uplink connection and a downlink connection (or several such uplink and downlink connections) are determined to be able to operate on a reduced set of resources, then the method 10 comprises both steps 13 and 14 (in any order). That is, the wireless device 5 is scheduled on reduced sets of resources both in UL and DL.

In an embodiment, the transmitting 11 to a wireless device 5 of configuration instructions instructing the wireless device 5 to enter a dual connectivity mode is performed based on information received from the wireless device 5 and/or from the second network node 3. As particular examples, the information based on which the transmitting 11 is performed comprises reference signal measurements received from the wireless device 5, and/or reference signal measurements received from the second network node 3, information on load situation of the second network node 3, buffer status reports received from the wireless device 5, and/or power headroom reports received from the wireless device 5.

In different embodiments of the method 10, the reduced set of resources comprises a reduced frequency bandwidth or a reduced number of time slots. The method 10 may thus be implemented in wireless networks 1 utilizing different radio access technologies.

In different embodiments of the method 10, the dual connectivity mode comprises uplink/downlink separation or Radio Resource Control diversity. The wireless device 5 being in various scenarios may thus benefit from the present teachings.

Figure 6:
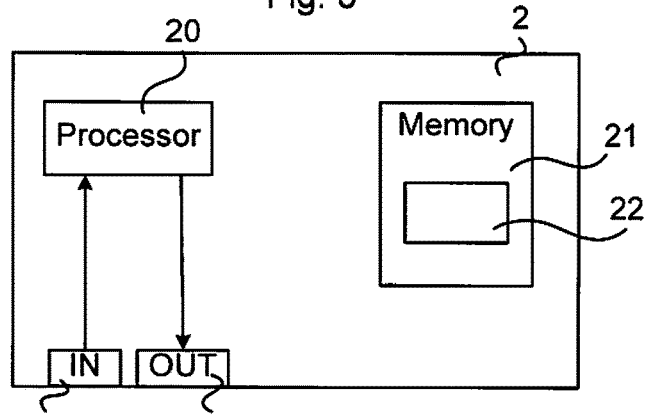
FIG. 6 illustrates schematically a network node and means for implementing methods of FIG. 5.

FIG. 6 illustrates schematically a network node and means for implementing the various embodiments of the method as described in relation to FIG. 5. The network node 2 is used for or configured to control resource usage. The network node 2 comprises a processor 20, which may comprise e.g. a central processing unit (CPU), microcontroller, digital signal processor, etc., and is capable of executing software instructions stored in a computer program product, e.g. in the form of a memory 21. The computer program product, e.g. the memory 21, thus comprises instructions executable by the processor 20. Such instructions may be comprised in a computer program 22, or one or more software modules or function modules.

Figure 7:
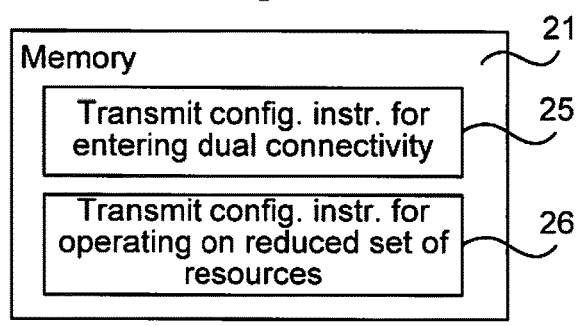
FIG. 7 illustrates a computer program product comprising functions modules for implementing methods of FIG. 5.

An example of an implementation using functions modules is illustrated in FIG. 7, wherein the memory 21 comprises means 25, in particular a first function module 25, for transmitting configuration instructions instructing the wireless device 5 to enter a dual connectivity mode with a second network node 3 on a second uplink connection UL2 and a second downlink connection DL2 between the wireless device 5 and the second network node 3 (step 11 of method 10). The memory 21 comprises means 26, in particular a second function module 26, for transmitting, when one or more of the uplink and downlink connections UL1, DL1, UL2, DL2 to the first and second network nodes 2, 3 is determined to be able to operate on a reduced set of resources, to the wireless device 5 configuration instructions instructing the wireless device 5 to operate on a reduced set of resources for the one or more uplink and downlink connections UL1, DL1, UL2, DL2 (step 12 of method 10). The memory 21 may comprise any combination of read and write memory (RAM) or read only memory (ROM), and may comprise persistent storage, which for example may be any single one or combination of magnetic memory, optical memory or solid state memory.

The network node 2 further comprises one or more input devices 23 by means of which the network node 2 may receive data from the wireless device 5 (via antennas, not illustrated) and from other network nodes 3 (e.g. via interconnecting cables 7). The network node 2 further comprises one or more output devices 24 by means of which the network node 2 may transmit data to the wireless device 5 (via antennas, not illustrated) and to other network nodes 3 (e.g. via interconnecting cables 7). The input device(s) 23 and the output device(s) 24 are operatively connected to the processor 20, which is thus able to transmit instructions to the wireless device 5 (via antennas, not illustrated), e.g. based on information received from the wireless device 5.

The network node 2, and in particular the processor thereof, may be configured to implement the various embodiments of the method 10 as described. In a particular example, the network node 2 may be used for controlling resource usage and is operative to have a first uplink connection UL1 and a first downlink connection DL1 with a wireless device 5. The network node 2 comprises the processor 20 and memory 21, the memory 21 containing instructions executable by the processor 20, whereby the network node 2 is operative to:

transmit to a wireless device 5 a configuration message instructing the wireless device 5 to enter a dual connectivity mode with a second network node 3 on a second uplink connection UL2 and a second downlink connection DL2 between the wireless device 5 and the second network node 3, and when one or more of the uplink and downlink connections UL1, DL1, UL2, DL2 to the first and second network nodes 2, 3 is determined to be able to operate on a reduced set of resources, transmitting (12) to the wireless device 5 configuration instructions instructing the wireless device 5 to operate on a reduced set of resources for the one or more uplink and downlink connections UL1, DL1, UL2, DL2.

In a variation of the above embodiment, the transmitting 12 of configuration instructions instructing the wireless device 5 to operate on a reduced set of resources is performed for a wireless device 5 having a data amount in the uplink or downlink connection UL1, DL1 to the first network node 2 that corresponds to a resource need smaller than a first threshold, e.g. smaller than the system resources for these connections UL1, DL1 and/or having a data amount in the uplink or downlink connection UL2, DL2 to the second network node 3 that corresponds to a resource need smaller than a second threshold, e.g. smaller than the system resources for these connections UL2, DL2.

In correspondence with the description of the method 10, in the network node 2, the reduced set of resources may comprise a reduced frequency bandwidth or a reduced number of time slots.

With reference still to FIGS. 6 and 7, the teachings of the present application also encompass a computer program 22 for controlling resource usage. The computer program 22 comprises computer program code, or instructions, which when run on the network node 2, and in particular the processor 20 thereof, causes the network node 2 to perform the methods as described, in particular the method 10 described above, and the variations thereof.

A computer program product 21 is also provided comprising the computer program 22 and computer readable means on which the computer program 22 is stored. The computer program product 21 may be any combination of read and write memory (RAM) or read only memory (ROM). The computer program product 21 may also comprise persistent storage, which for example can be any single one or combination of magnetic memory, optical memory or solid state memory.

Figure 8:
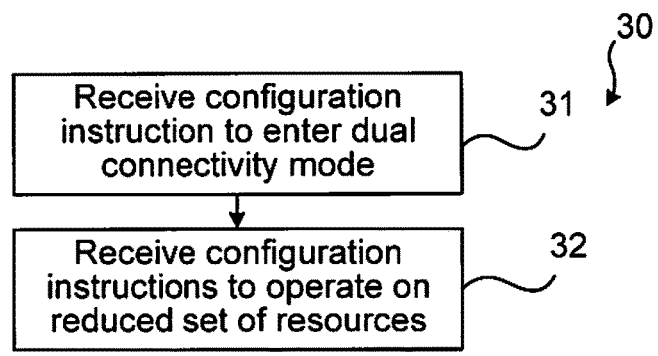
FIG. 8 illustrates a flowchart over steps of a method in a wireless device in accordance with the present teachings.

FIG. 8 illustrates a flowchart over steps of a method in a wireless device 5 in accordance with the present teachings. The method 30 is performed in the wireless device 5, wherein the wireless device 5 has a first uplink connection UL1 and a first downlink connection DL1 with a network node 2.

The method 20 comprises receiving 31, from the network node 2, configuration instructions to enter a dual connectivity mode with a second network node 3 on a second uplink connection UL2 and a second downlink connection DL2 between the wireless device 5 and the second network node 3.

The method 20 further comprises receiving 32, from the network node 2, configuration instructions to operate on a reduced set of resources for the uplink and/or downlink connection UL1, DL1 to the first network node 2 and/or to operate on a reduced set of resources for the uplink and/or downlink connection UL2, DL2 to the second network node 3.

By configuring the wireless device 5 to operate on a reduced set of resources it is enabled to reduce battery consumption, thus prolonging the battery life time and operation time of the wireless device 5. The wireless device 5 may reduce the energy consumption in different ways, for example, the wireless device 5 may be able to turn off some electronics.

If the resources comprise frequency, operating on a reduced bandwidth can e.g. lead to reduced power consumption in the analog/digital and digital/analog converters and filters. If the resources comprise time, certain parts of the electronic can quickly be turned on and off thus reducing power consumption; examples of such electronic for example comprising low-noise amplifier, mixer stage and filters. In both cases the power consumption in digital baseband can be reduced since its power consumption typically depends on data rate.

In different embodiments, the reduced set of resources comprises a reduced frequency bandwidth or a reduced number of time slots.

In other embodiments, the configuration instructions to enter a dual connectivity mode and the instructions to operate on a reduced set of resources are comprised in a single configuration message or in multiple configuration messages.

Figure 9:
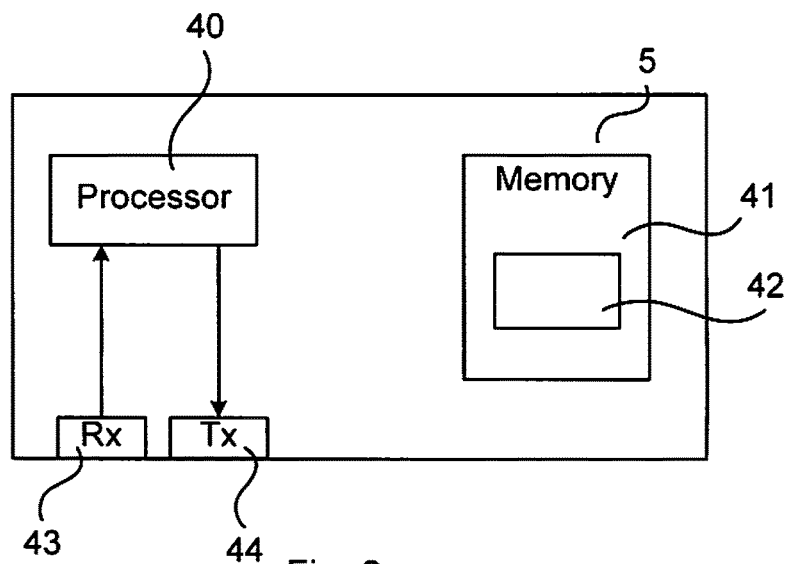
FIG. 9 illustrates schematically a wireless device and means for implementing methods of FIG. 8.

FIG. 9 illustrates schematically a wireless device 5 and means for implementing the various embodiments of the method 30 of FIG. 8. The wireless device 5 comprises a processor 40, which may comprise e.g. a CPU, microcontroller, digital signal processor etc., and is capable of executing software instructions stored in a computer program product, e.g. in the form of a memory 41. The computer program product, e.g. the memory 41, thus comprises instructions executable by the processor 40. Such instructions may be comprised in a computer program 42, or one or more software modules or function modules.

The wireless device 5 comprises one or more receivers 43 (only one illustrated) for receiving signaling from the network nodes 2, 3, as transmitted by antennas of the network nodes 2, 3. The wireless device 5 comprises one or more transmitters 44 (only one illustrated) for transmitting signaling to the network nodes 2, 3 for reception of antennas of the network nodes 2, 3.

Figure 10:
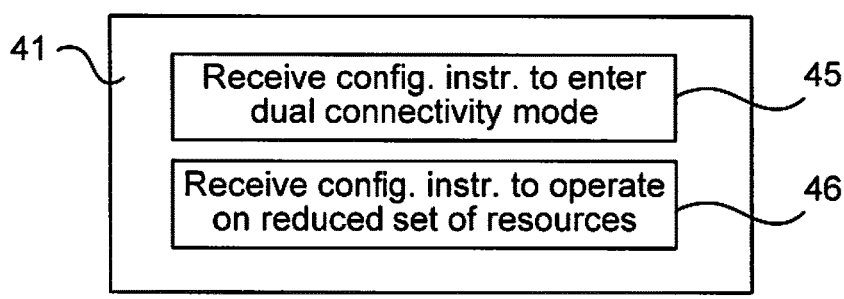
FIG. 10 illustrates a computer program product comprising functions modules for implementing methods of FIG. 8.

An example of an implementation using function modules is illustrated in FIG. 10, wherein the memory 41 comprises means, 45, in particular a first function module 45, for receiving, from the network node 2, configuration instructions to enter a dual connectivity mode with a second network node 3 on a second uplink connection UL2 and a second downlink connection DL2 between the wireless device 5 and the second network node 3 (step 31 of method 30). The memory 41 comprises means, in particular a second function module 46, for receiving, from the network node 2, configuration instructions to operate on a reduced set of resources for the uplink and/or downlink connection UL1, DL1 to the first network node 2 and/or to operate on a reduced set of resources for the uplink and/or downlink connection UL2, DL2 to the second network node 3 (step 32 of method 30).

The function modules can be implemented using software instructions such as computer program executing in a processor and/or using hardware, such as application specific integrated circuits, field programmable gate arrays, discrete logical components etc.

Based on the above, an embodiment of the wireless device 5 may be implemented, e.g. comprising the means 45, 46 as described above. In an embodiment thus, the wireless device 5 comprises: means, e.g. function module 45, for receiving, from the network node 2, configuration instructions to enter a dual connectivity mode with a second network node 3 on a second uplink connection UL2 and a second downlink connection DL2 between the wireless device 5 and the second network node 3 (step 31 of method 30); and means, e.g. function module 46, for receiving, from the network node 2, configuration instructions to operate on a reduced set of resources for the uplink and/or downlink connection UL1, DL1 to the first network node 2 and/or to operate on a reduced set of resources for the uplink and/or downlink connection UL2, DL2 to the second network node 3 (step 32 of method 30).

The wireless device 5, and in particular the processor 40 thereof, may be configured to implement the various embodiments of the method 30 as described. In a particular example, the wireless device 5 is enabled for controlled resource usage and has a first uplink connection UL1 and a first downlink connection DL1 with a network node 2. The wireless device 5 comprises the processor 40 and memory 41, the memory 41 containing instructions executable by the processor 40, whereby the wireless device 5 is operative to: receive, from the network node 2, configuration instructions to enter a dual connectivity mode with a second network node 3 on a second uplink connection UL2 and a second downlink connection DL2 between the wireless device 5 and the second network node 3; and to receive, from the network node 2, configuration instructions to operate on a reduced set of resources for the uplink and/or downlink connection UL1, DL1 to the first network node 2 and/or to operate on a reduced set of resources for the uplink and/or downlink connection UL2, DL2 to the second network node 3.

In different embodiments and in correspondence with the description of the method 30, the reduced set of resources may comprise a reduced frequency bandwidth or a reduced number of time slots.

With reference to FIGS. 9 and 10, the teachings of the present application also encompass a computer program 42 for controlling resource usage. The computer program 42 comprises computer program code, or instructions, which when run on the wireless device 5, and in particular the processor 40 thereof, causes the wireless device 5 to perform the methods as described, in particular the method 30 described above, and the variations thereof.

A computer program product 41 is also provided comprising the computer program 42 and computer readable means on which the computer program 42 is stored. The computer program product 41 may be any combination of read and write memory (RAM) or read only memory (ROM). The computer program product 41 may also comprise persistent storage, which for example can be any single one or combination of magnetic memory, optical memory or solid state memory.

Figure 11:
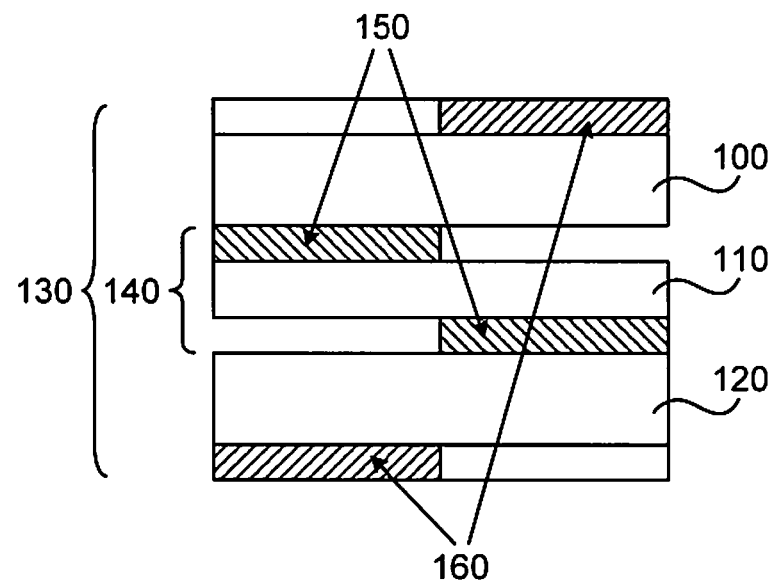
FIGS. 11 and 12 illustrate examples of implementation of reduced resource utilization.
Figure 12:
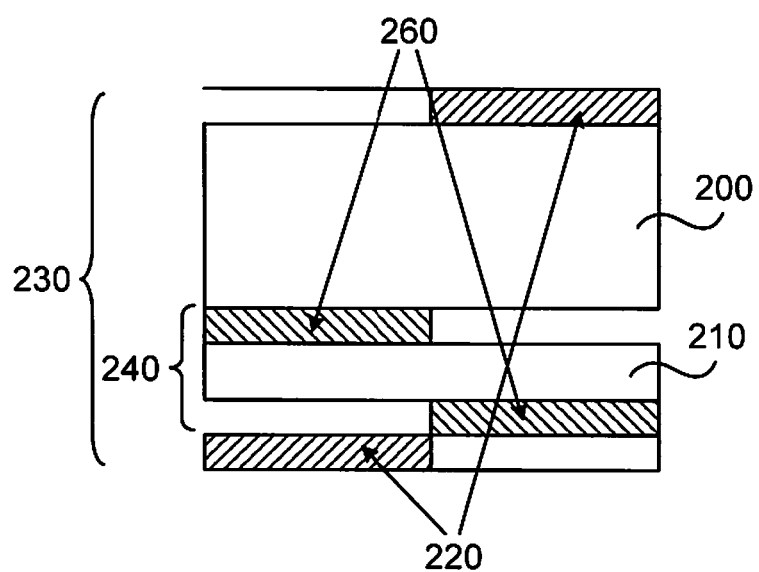

FIGS. 11 and 12 illustrate examples of implementation of reduced resource utilization. As particular example, Long Term Evolution (LTE) is used for describing exemplary embodiments and general considerations needed. In LTE HARQ feedback for DL transmissions is transmitted on a physical uplink control channel (PUCCH), which is a narrowband channel that applies frequency hopping at slot boundaries. In the first slot PUCCH is transmitted at one bandwidth edge and in the next slot at the other bandwidth edge. There are various conceivable ways of configuring the wireless device 5, and in particular the receiver and/or transmitter thereof, to operate on a reduced bandwidth, or more generally on a reduced set of resources.

With reference to FIG. 11, and exemplifying resources by bandwidth, a first wireless device 5 is operating with a reduced UL bandwidth 140. The first wireless device 5 is now not able to hop across the system bandwidth 130 but only across its own smaller reduced bandwidth 140, located in the middle of the system bandwidth 130, as illustrated in FIG. 11. In particular, the UL system bandwidth 130 can be seen as split into three clusters 100, 110, 120. The first wireless device 5 operates, in the illustrated case, on reduced bandwidth 140, and PUCCH frequency hopping across UL bandwidth configured for the first wireless device 5 is exemplified at reference numeral 150.

An implementation consideration is that in sub-frames where the first wireless device 5 is transmitting PUCCH, other terminals, e.g. a second wireless device 6, operating with the wide UL system bandwidth can no longer be scheduled across the complete system bandwidth, without interfering the PUCCH of first wireless device 5, since the narrowband PUCCH signal divides the system bandwidth into the three clusters 100, 110, 120.

In another embodiment, the narrowband PUCCH signal of the first wireless device 5 is moved to one of the system bandwidth edges (the lower bandwidth edge as illustrated in FIG. 12). The number of clusters 200, 210 is then reduced to two. LTE Rel-10 defines UL transmissions with two clusters, thus Rel-10 enabled wireless devices supporting clustered UL transmissions can gain access to the complete system bandwidth.

In other embodiments, the existing PUCCH signal is not used, but either a new PUCCH signal is defined or physical uplink shared channel (PUSCH) is used to transmit HARQ signaling.

In yet other embodiments, frequency hopping is implemented over the whole frequency band, while still letting the wireless device 5 operate only over a narrowband bandwidth (i.e. with reduced resources). In such embodiments the wireless device 5 would have to be configured to retune its transmitter for each slot so that the narrowband bandwidth covers the PUCCH spectrum currently transmitted. Since retuning a local oscillator requires time, a certain guard period must be inserted between slot boundaries (where hops occur), e.g. by defining a new PUCCH format that does not use all orthogonal frequency division multiplexing (OFDM) symbols within a slot.

The wireless device 5 may be connected in the UL with a certain network node but only receives HARQ feedback for its DL transmissions from this network node. It would therefore be more energy efficient to operate this DL with a bandwidth smaller than the DL system bandwidth.

HARQ feedback for UL transmissions is either carried on physical hybrid ARQ indicator channel (PHICH) or via the New Data Indicator in a subsequent UL grant (adaptive retransmissions). PHICH spans the complete DL system bandwidth, i.e. receiving PHICH requires the wireless device 5 to receive the complete system bandwidth. Therefore, in an embodiment, a new PHICH channel spanning only a fraction of the DL system bandwidth is implemented. If such a new channel is defined it is sufficient for the wireless device 5 to receive only that fraction of the system bandwidth carrying the new PHICH channel.

UL grants—which via the New Data Indicator carry HARQ feedback—are either transmitted on physical downlink control channel (PDCCH) or enhanced physical downlink control channel (EPDCCH). PDCCH also spans the complete DL system and therefore, in correspondence with the above, a new PDCCH channel may be implemented spanning only a fraction of the DL system bandwidth. EPDCCH on the other hand already spans only one or few resource blocks and can be received by the wireless device 5 which is configured to operate on a reduced DL bandwidth, i.e. operates its DL with a bandwidth narrower than the DL system bandwidth.

Common signals like synchronization signals, e.g. primary synchronization signal/secondary synchronization signal (PSS/SSS), and physical broadcast channel (PBCH) are transmitted in the center-6 resource blocks (RB), and it is therefore advantageous to choose implementations wherein the wireless device 5 is configured to operate on a DL bandwidth covering the center-six RB. If still choosing an implementation wherein the wireless device 5 fails to cover the center-six RB, the wireless device 5 should be configured to from time to time have to change its processing to enable reception of the center-six resource blocks, thus receiving the necessary control signaling.

The above teachings of operation with reduced bandwidth for asymmetric UL/DL traffic to a network node can be generalized, as is described next.

Even though outlined in the context of UL/DL separation, wherein wireless devices communicate, with a network node, large amounts of data in one direction but only HARQ feedback in the other direction, the same principle of reduced resource usage such as reduced bandwidth can be applied to other scenarios as well, wherein the amount of traffic received/transmitted from/to a point is asymmetric. It is again noted that bandwidth is merely used as an illustrative example of resources.

For example, the use of reduced resources is most useful if a wireless device comprises several transmitters, and uses different transmitters for the transmissions received by the UL network node and the DL network node and/or different receivers used for DL transmissions generated by the DL network node and UL network node. This can occur if regular UL and DL transmissions happen in different bands.

If the wireless device uses the same transmitter/receiver and applies time division multiplexing (TDM) it may apply different bandwidths in different slots, e.g. it may transmit with a wide bandwidth in a slot when it communicates with the UL network node and with a narrowband bandwidth when it sends HARQ feedback to the DL network node.

The teachings of the present application may further be applied when the need of data capacity to/from a particular network node is small in relation to the full network node capacity. For example, if the wireless device is connected to a second network node from/to which only control plane information is exchanged, it can utilize a smaller bandwidth to that network node, than the full system bandwidth, thereby operating with reduced power consumption.

Still other scenarios which would benefit from implementing the present teachings, in particular the operation with a network node using a reduced bandwidth, comprise scenarios where the capacity need expected from that network node is substantially lower than that offered by the full system bandwidth. For example, for a wireless device that is connected to at least two network nodes (dual connectivity), a first connected network node can be dedicated to the communication of low-rate information, thus not requiring the full system bandwidth. Data/information transfer requiring higher rates can be served from the second connected node. Note that this can apply to the downlink, the uplink, or jointly in the uplink and downlink.

One such scenario is where the first network node represents an anchor node from/to which control plane signaling is communicated, and where the second node represents a booster node from/to which high rate user plane data is communicated. Communication to such an anchor node generally requires very low bit rate, but should provide a reliable link for robust operation of the network. However, the required low bit rate for a wireless device to an anchor node would allow operation at a reduced bandwidth (relative the system bandwidth), whenever the anchor node does not also serve high rate user plane services to the wireless device. Note also (as mentioned earlier), that a physical node can act as a low rate anchor node to a first wireless device, whereas the same physical node serves high rate user plane data to a second wireless device. For example, the first network node may be a macro node that acts as an anchor node to the first wireless device, which is dual connected with a small cell node (e.g., a pico node) that provides the user plane data to the wireless device. However, a second wireless device is only connected to the macro node, and can hence receive high data rate over the full system bandwidth from the macro node.

In a related scenario a wireless device is dual connected to at least a first and a second network node (e.g. eNB), and operates with RRC diversity. In this scenario, the wireless device is primarily served by a first network node that provides full service to the wireless device, whereas the second network node provides diversity for selected, or all, RRC transmissions (in UL and/or DL) by, for example, echoing (or receiving them) such RRC transmissions to the wireless device, thereby giving the wireless device a second chance to receive (transmit) them. In this scenario, the wireless device can connect with a reduced bandwidth to the second network node to receive/transmit the low rate transmissions.

Above the resources have been mainly exemplified by frequency resources. However, the resources may alternatively comprise time resources, e.g. time slots. The wireless device 5 may then be scheduled for reception or transmission on fewer time slots than what could be offered by the network. For example, when an uplink and/or downlink connection to a first network node 2 has been determined to be able to operate on a reduced set of time slots, the wireless device 5 can be scheduled in the reduced set of time slots for the connection to the first network node 2. The wireless device 5 may be scheduled for receiving/transmitting e.g. every Nth sub-frame for a duration of L sub-frames, wherein L<N, instead of every Mth sub-frame that it could have been scheduled with, wherein M<N.

In the above embodiments, energy efficiency of the wireless device can be further improved by applying separate DRX settings for the two network nodes, thereby restricting which sub-frames the wireless device considers for reception of messages from the two network nodes, respectively. For example, when an uplink and/or downlink connection to a first network node 2 has been determined to be able to operate on a reduced set of resources, while a connection to the second network node 3 cannot be operated on a reduced set of resources, then the wireless device 5 can be configured with first DRX settings for the connection to the first network node 2 and with second DRX settings for the connection to the second network node 3. The first DRX settings may then comprise configuring the wireless device 5 to enter DRX mode more often, and/or for longer duration, compared to the second DRX settings.

The invention has mainly been described above with reference to a few embodiments. However, as is appreciated by a person skilled in the art, other embodiments than the particular ones disclosed above are equally possible within the scope of the invention, as defined by the appended patent claims.

The invention claimed is:

1. A method for controlling resource usage performed in a first network node, the first network node having a first uplink connection and a first downlink connection with a wireless device, the method comprising:
transmitting, to a wireless device, configuration instructions instructing the wireless device to enter a dual connectivity mode with a second network node on a second uplink connection and a second downlink connection between the wireless device and the second network node; and
in response to determining that one or more of the uplink and downlink connections to the first and/or second network nodes is able to operate on a reduced set of resources, transmitting, to the wireless device, configuration instructions instructing the wireless device to operate on the reduced set of resources for the one or more of the uplink and downlink connections, wherein the reduced set of resources comprises a reduced frequency bandwidth and/or wherein the reduced set of resources comprises a reduced number of time slots.

2. The method of claim 1, wherein the transmitting of the configuration instructions instructing the wireless device to operate on the reduced set of resources is performed for the wireless device having a data amount in the first uplink or the first downlink connection to the first network node that corresponds to a resource need smaller than a first threshold for the first uplink and the first downlink connections and/or having a data amount in the second uplink or the second downlink connection to the second network node that corresponds to a resource need smaller than a second threshold for the second uplink and the second downlink connections.

3. The method of claim 1, wherein the wireless device is configured with the reduced set of resources in one or both of the uplink connections and wherein the method further comprises:
scheduling the wireless device with uplink resources falling within the reduced set of resources.

4. The method of claim 1, wherein the wireless device is configured with the reduced set of resources in one or both of the downlink connections and wherein the method further comprises:
scheduling the wireless device with downlink resources falling within the reduced set of resources.

5. The method of claim 1, wherein the transmitting, to the wireless device, of configuration instructions instructing the wireless device to enter the dual connectivity mode is performed based on information received from the wireless device and/or from the second network node.

6. The method of claim 5, wherein the information comprises reference signal measurements received from the wireless device, and/or reference signal measurements received from the second network node, and/or information on load situation of the second network node, and/or buffer status reports received receive from the wireless device, and/or power headroom reports received from the wireless device.

7. The method of claim 1, wherein the dual connectivity mode comprises uplink/downlink separation or Radio Resource Control diversity.

8. The method of claim 1, wherein the configuration instructions to enter the dual connectivity mode and the instructions to operate on the reduced set of resources are comprised in a single configuration message or in multiple configuration messages.

9. A network node capable of controlling resource usage and operative to have a first uplink connection and a first downlink connection with a wireless device, the network node comprising a processor and memory, the memory containing instructions executable by the processor, whereby the network node is operative to:
transmit, to a wireless device, a configuration message instructing the wireless device to enter a dual connectivity mode with a second network node on a second uplink connection and a second downlink connection between the wireless device and the second network node; and
in response to determining that one or more of the uplink and downlink connections to the first and/or second network nodes is able to operate on a reduced set of resources, transmitting, to the wireless device, configuration instructions instructing the wireless device to operate on the reduced set of resources for the one or more of the uplink and downlink connections, wherein the reduced set of resources comprises a reduced frequency bandwidth and/or wherein the reduced set of resources comprises a reduced number of time slots.

10. The network node of claim 9, wherein the instructions executable by the processor are configured such that the transmitting of the configuration instructions instructing the wireless device to operate on the reduced set of resources is performed for the wireless device having a data amount in the first uplink or the first downlink connection to the first network node that corresponds to a resource need smaller than a first threshold for the first uplink and the first downlink connections and/or having a data amount in the second uplink or the second downlink connection to the second network node that corresponds to a resource need smaller than a second threshold for the second uplink and the second downlink connections.

11. A method performed in a wireless device for controlled resource usage, the wireless device having a first uplink connection and a first downlink connection with a network node, the method comprising:
    receiving, from the network node, configuration instructions to enter a dual connectivity mode with a second network node on a second uplink connection and a second downlink connection between the wireless device and the second network node; and
    receiving, from the network node, configuration instructions to operate on a reduced set of resources for the first uplink and/or the first downlink connection to the first network node and/or to operate on the reduced set of resources for the second uplink and/or the second downlink connection to the second network node, wherein the reduced set of resources comprises a reduced frequency bandwidth and/or wherein the reduced set of resources comprises a reduced number of time slots.

12. The method of claim 11, wherein the dual connectivity mode comprises uplink/downlink separation or Radio Resource Control diversity.

13. The method of claim 11, wherein the configuration instructions to enter the dual connectivity mode and the configuration instructions to operate on the reduced set of resources are comprised in a single configuration message or in multiple configuration messages.

14. A wireless device for controlled resource usage, the wireless device having a first uplink connection and a first downlink connection with a network node, the wireless device comprising a processor and memory, the memory containing instructions executable by the processor, whereby the wireless device is operative to:
    receive, from the network node, configuration instructions to enter a dual connectivity mode with a second network node on a second uplink connection and a second downlink connection between the wireless device and the second network node; and
    receive, from the network node, configuration instructions to operate on a reduced set of resources for the first uplink and/or the first downlink connection to the first network node and/or to operate on the reduced set of resources for the second uplink and/or the second downlink connection to the second network node, wherein the reduced set of resources comprises a reduced frequency bandwidth and/or wherein the reduced set of resources comprises a reduced number of time slots.

* * * * *